United States Patent [19]
Bakhmutsky

[11] Patent Number: 5,963,260
[45] Date of Patent: Oct. 5, 1999

[54] MACROBLOCK-LEVEL PARTITIONED HDTV VIDEO DECODER AND RELATED METHOD

[75] Inventor: Michael Bakhmutsky, Spring Valley, N.Y.

[73] Assignee: U.S. Philips Electronics North America Corporation, New York, N.Y.

[21] Appl. No.: 08/819,894

[22] Filed: Mar. 18, 1997

[51] Int. Cl.[6] .................................................. H04N 7/26
[52] U.S. Cl. .......................................... 348/420; 382/246
[58] Field of Search .................................... 348/384, 390, 348/408–412, 419, 420; 382/232, 244–246; 341/50, 67; 711/200; H04N 7/26

[56] References Cited

U.S. PATENT DOCUMENTS

| | | | |
|---|---|---|---|
| 5,173,695 | 12/1992 | Sun et al. | 341/67 |
| 5,386,212 | 1/1995 | Shen et al. | 341/67 |
| 5,436,665 | 7/1995 | Ueno et al. | 348/412 |
| 5,488,418 | 1/1996 | Mishima et al. | 348/420 |
| 5,585,855 | 12/1996 | Ozaki et al. | 348/408 |
| 5,596,421 | 1/1997 | Shibata et al. | 348/420 |
| 5,600,812 | 2/1997 | Park | 711/200 |
| 5,650,905 | 7/1997 | Bakhmutsky | 341/67 |
| 5,657,016 | 8/1997 | Bakhmutsky et al. | 341/67 |
| 5,666,116 | 9/1997 | Bakhmutsky | 341/67 |
| 5,668,548 | 9/1997 | Bakhmutsky | 341/67 |
| 5,686,915 | 11/1997 | Nelson et al. | 341/67 |
| 5,687,256 | 11/1997 | Kimura et al. | 382/232 |
| 5,798,717 | 8/1998 | Bakhmutsky et al. | 341/50 |
| 5,805,302 | 9/1998 | Enari et al. | 348/420 |
| 5,808,570 | 9/1998 | Bakhmutsky | 341/67 |
| 5,812,074 | 9/1998 | Chung | 341/50 |

FOREIGN PATENT DOCUMENTS

| | | | | |
|---|---|---|---|---|
| WO 9724808A1 | 7/1997 | WIPO | | H04N 7/26 |
| WO 9724810A1 | 7/1997 | WIPO | | H04N 7/26 |

Primary Examiner—Richard Lee
Attorney, Agent, or Firm—Laurie E. Gathman

[57] ABSTRACT

A microblock-level partitioned digital HDTV video decoder for decoding a bit stream consisting of a series of macroblocks of digital video data which are coded in accordance with an MPEG or other predetermined digital compression code. The decoder includes a bit stream parser for identifying boundaries between the macroblocks and producing macroblock boundary information indicative of the identified boundaries, a bit stream formatter for combining the macroblock boundary information with the bit stream to produce a combined bit stream having successive multi-bit portions, a rate buffer for storing and sequentially outputting the successive multi-bit portions, first and second FIFO memories, and a FIFO controller for alternately write enabling the first and second FIFO memories in response to the macroblock boundary information. The FIFO memories thereby alternately store the successive macroblocks in the combined bit stream sequentially outputted from the rate buffer. First and second variable length decoders decode the successive multi-bit portions of the combined bit stream respectively stored in the first and second FIFO memories. A related method is also presented.

38 Claims, 2 Drawing Sheets

FIG. 3

MACROBLOCK-LEVEL PARTITIONED HDTV VIDEO DECODER AND RELATED METHOD

BACKGROUND OF THE INVENTION

The present invention relates generally to digital video decoders, and, more particularly, to an HDTV video decoder partitioned on a macroblock level, and a related method.

In digital video data transmission systems, video data is encoded prior to being transmitted to a receiver, which decodes the encoded digital video data. The decoded digital video data is then output to a subsequent signal processing stage. To increase the data throughput and memory efficiency of such systems, statistical compression algorithms are used to compress and encode the digital video data. One such compression algorithm is the Huffman coding algorithm. Compressing the data typically results in data streams segmented into variable length code words rather than fixed length code words. Variable length decoders decode the variable length code words comprising the compressed data stream.

There are several presently available methods for decoding a sequence of variable length code words. The most prevalent methods are the tree searching algorithm and the table look-up technique.

The tree searching algorithm uses a bit-by-bit search through a code tree to find the end and value of each code word in the input bit stream. The coding tree includes leaves of known code words. The decoding process begins at the root of the coding tree and continues bit-by-bit to different branches of the coding tree, depending upon the decoded value of each successive bit in the bit stream. Eventually a leaf is reached and the end of the code word is detected. The code word is then segmented from the rest of the bit stream and the value of the detected code word is looked up and output from the variable length decoder. Decoding a bit stream using the tree searching algorithm is too slow for many high speed applications, since the decoding operation is performed at the bit rate rather than at the symbol rate. In this connection, decoding a bit stream at the bit rate does not satisfy the peak symbol rate requirements of an HDTV decoder.

To increase the data throughput of a variable length decoder, a table look-up decoder was developed, such as the one disclosed in U.S. Pat. No. 5,173,695, issued to Sun et al., the disclosure of which is herein incorporated by reference. The input of the table look-up decoder disclosed in the above-referenced patent is connected to the output of a rate buffer which receives a variable-word-length encoded bit stream at its input and outputs in parallel sequences of bits equal in length to the maximum length code word in the bit stream. These sequences are read into cascaded latches. The cascaded sequences in both latches are input to a barrel shifter which provides from its multi-bit input, a sliding decoding window to a table-lookup decoder. A control signal directly shifts the position of the decoding window of the barrel shifter as each code word is detected.

To detect each code word, the initial bits in the decoding window are compared with code word entries in the table-lookup decoder When a code word is detected, the corresponding code word length is added to the value of an accumulator with previously accumulated code word lengths to produce the control signal which directly shifts the decoding window by the number of bits in the just decoded word. When all of the bits in the first latch have been decoded, the next bit sequence in the buffer is input to the second latch while the previous bit sequence in the second latch is transferred to the first latch. The decoding window is then shifted to the beginning of the next code word in the undecoded sequence. The shifting of the decoding window and the decoding of the code word can be done in one clock cycle. As a result, the table look-up decoder is capable of decoding one code word per clock cycle regardless of its bit length, thereby dramatically increasing the data throughput of the decoder relative to the previously available tree searching algorithm decoder.

In consumer HDTV applications, however, where the peak symbol rates are in excess of 100 million code words per second, decoding the whole picture at the symbol rate with a single variable length decoder becomes impractical. In HDTV systems, the variable length decoder (VLD) is used to extract an entire picture from a rate buffer within the picture display time. The VLD must decode words in the data stream at the peak symbol rate (PSR), which depends upon the display resolution and the display time. For HDTV systems which use the MPEG ("Moving Pictures Expert Group") protocol, a VLD throughput in excess of 100 million or more code words per second is required.

In addition to the technical problems associated with implementing the VLD itself with such throughput, the high-speed VLD interface with the large capacity rate buffer is quite expensive with the currently available memory technology. The problem becomes more severe if price is an issue, since faster and more expensive memory devices such as static random access memories (SRAMs) or synchronous dynamic random access memories (SDRAMs) must be used, rather than slower and cheaper memory devices such as asynchronous DRAMs. Of course, the price of the memory is a particularly important consideration for a consumer product, such as an HDTV set.

In current implementations, HDTV video decoders are normally partitioned into multiple processing paths, using multiple VLDs to decode different portions of the picture in parallel. In such implementations, the VLD is one of the major bottlenecks, as this constitutes the point of transition between the compressed and decompressed domains. Because each partition of the picture may contain almost all of the picture information, multiple dedicated ping-pong buffers are required between all of the VLDs and the rate buffer, thereby dramatically increasing the amount of bit stream memory required for the system. For example, a partitioned decoding system having eight parallel VLDs may require eight ping-pong buffers, each one of the ping-pong buffers being twice the size of the rate buffer, thereby increasing the amount of required buffer memory by a factor of sixteen over a system having a single VLD.

In HDTV systems, the input bit stream is normally an MPEG digital video data stream which includes payload data and setup data. The payload data, which constitutes the overwhelming majority of the data (about 95% of the data), is represented by code words such as DCT (discrete cosine transform) coefficients and motion vectors, which are decoded using their respective look-up tables. The setup data, which constitutes the remaining portion of the data (about 5% of the data), is represented by singular code words which are decoded using different look-up tables.

Various techniques have been proposed by the present inventor in various copending patent applications in order to implement the HDTV video decoder using a single VLD rather than a partitioned HDTV video decoder using multiple VLDs. For example, a variable length decoder capable of pre-tagging the input bit stream and of parallel processing of contiguous code words of identical type was developed and disclosed in a co-pending U.S. patent application entitled "HIGH PERFORMANCE VARIABLE LENGTH DECODER WITH ENHANCED THROUGHPUT DUE TO TAGGING OF THE INPUT BIT STREAM AND PARALLEL PROCESSING OF CONTIGUOUS CODE WORDS," by M. Bakhmutsky (the present inventor), Ser. No. 08/580,405, filed Dec. 28, 1995, the teachings of which are herein incorporated by reference. Although the variable length decoder disclosed in the above-referenced application constitutes an excellent solution for both higher throughput and lower clock rate, the overhead of both the tree-searching pre-tagging circuit and the additional buffer memory of the same size as the rate buffer result in a product cost which may be prohibitive for at least some consumer HDTV decoders. Thus, the cost of this variable length decoder constitutes a shortcoming thereof.

Accordingly, a high performance variable length decoder meeting these stringent requirements for a consumer HDTV decoder was developed and disclosed in a co-pending U.S. patent application entitled "VARIABLE LENGTH DECODER WITH ADAPTIVE ACCELERATION IN PROCESSING OF HUFFMAN ENCODED BIT STREAMS", by M. Bakhmutsky (the present inventor), Ser. No. 08/580,407, filed Dec. 28, 1995, the teachings of which are herein incorporated by reference. The throughput per clock cycle of the variable length decoder disclosed in this application is adaptively increased for a selected group of code words in the Huffman encoded input bit stream which have a bit length less than a prescribed number, by decoding combinations of two or more code words from the selected group, during a single clock cycle, using a combination value look-up table. Since the code words in the selected group are the statistically most frequently occurring code words in the Huffman encoded input bit stream, the variable length decoder is able to process an entire picture at a reduced clock rate, without sacrificing throughput. Thus, improved statistical performance is attained due to adaptive acceleration in processing code words in the selected group.

However, while this statistical performance enhancement mechanism guarantees a higher average minimum code word length for an entire picture, it does not guarantee that picture elements smaller than the size of the entire picture may be processed with higher throughput. The inability to guarantee high performance with regard to local activity constitutes a shortcoming of this variable length decoder, since it could impair real-time picture processing. Good handling of local activity is vital for real-time picture processing performed without unnecessary overhead in picture memory.

A high-performance variable length decoder with two-word bit stream segmentation (and related method) which achieves high performance without the expense of high hardware complexity and additional memory is disclosed in a copending U.S. patent application entitled "HIGH PERFORMANCE VARIABLE LENGTH DECODER WITH TWO-WORD BIT STREAM SEGMENTATION AND RELATED METHOD", by Michael Bakhmutsky, Ser. No. 08/672,246, filed Jun. 26, 1996, the disclosure of which is incorporated herein by reference. The VLD disclosed in this co-pending application is capable of processing macroblocks in real-time at rates exceeding 100 million code words per second, thus satisfying the stringent requirements for use in contemporary digital HDTV video decoders, such as an MPEG-2 Main Profile, High Level compliant HDTV video decoder. Provided that the bit width of the decoding window is wide enough to accomodate two maximum-size code words, the qualifying code words are guaranteed to be processed with double throughput at approximately one-half of the clock rate required for the conventional single-path VLD disclosed in U.S. Pat. No. 5,173,695, issued to Sun et al. The maximum-size qualifying code word (AC coefficient) in the MPEG-2 protocol is 24 bits long. Therefore, providing a 48-bit-wide decoding window will guarantee double throughput for all qualifying code words.

However, in the actual hardware implementation of the high-performance VLD with two-word bit stream segmentation disclosed in this co-pending application, the 48-bit-wide decoding window is disadvantageous, because it results in a reduced speed of operation and a higher gate count in silicon, and thus, is less economical than is desirable for many consumer applications. Although it might be possible to find a VLD implementation which constitutes an acceptable statistical trade-off amongst the width of the decoding window, the macroblock clock cycle allocation (VLD clock rate), and the acceptable frequency of VLD failures in those worst-case situations in which too many specific qualifying code word pairs are "broken", i.e., not parallel-processed or "pair-matched", due to their combined length exceeding the bit width of the limited-size decoding window, this VLD implementation would not be "failure-free" (i.e., immune to failures), and thus, would not meet the most stringent requirements of some contemporary digital HDTV video decoders.

In order to overcome the limitations of the above-mentioned high-performance VLD with two-word bit stream segmentation, an improvement thereto which uses pair-match Huffman transcoding was developed by the present inventor and disclosed in co-pending U.S. patent application Ser. No. 08/749,039, which is a C-I-P of the aforementioned U.S. patent application Ser. No. 08/672,246, the disclosure of which is also incorporated herein by reference. The improved high-performance VLD disclosed in this C-I-P application utilizes a decoding window having a bit-width less than double the length of the maximum-length qualifying code word, while at the same time guaranteeing both double throughput and failure-free peak code word throughput on the macroblock level. Such a high-performance VLD with two-word bit stream segmentation provides a higher throughput, lower-cost, failure-free, "unbreakable" VLD architecture that can satisfy the most stringent requirements of the contemporary digital HDTV video decoders with minimal memory overhead.

However, while the above-described single-VLD HDTV video decoder implementations disclosed in the present inventor's above-referenced co-pending U.S. patent applications provide many significant advantages over the presently available technology, they do so at the cost of higher complexity and memory utilization than may be desired for some consumer HDTV applications, at least at the current level of VLSI technology. In this connection, it is desirable to implement a partitioned HDTV video decoder which utilizes less memory than some of the single-VLD implementations disclosed in the present inventor's co-pending applications discussed hereinabove. Further, it is desirable to synchronize the entire decoder to the same slow clock, and thereby eliminate complex multi-port access to the rate buffer. It is also desirable to reduce the rate buffer memory access speed requirement and to more efficiently utilize rate buffer memory space. Moreover, it is desirable to improve the speed performance and to reduce the gate count of the VLD. The macroblock-level partitioned HDTV video decoder of the present invention achieves each of these desired goals.

In general, partitioning an HDTV video decoder into multiple VLDs is difficult because the smallest bit stream unit of the encoded (compressed) digital video bit stream which is identifiable by a fixed length decoder is a slice. In accordance with the MPEG-2 coding protocol which is the standard for consumer-level HDTV systems, a slice consists of a variable number of macroblocks. As such, the smallest unit of partitioning is normally a group of slices constituting a full raster, where the group of slices consists of a fixed number of macroblocks. Partitioning the HDTV video decoder in this manner imposes a requirement for a significant amount of memory to store these bit stream units (i.e., group of slices), as well as a requirement for a "concurrent" or multi-port access to dynamically changing data locations in the rate buffer. The present invention introduces a novel method of partitioning the HDTV video decoder in order to overcome these significant disadvantages of presently available partitioned HDTV video decoders, and to achieve the above-identified desired goals.

SUMMARY OF THE INVENTION

In overview, the present invention achieves such efficient partitioning of the HDTV video decoder on a macroblock level by decoding the macroblock boundaries of an MPEG-2 digital video bit stream prior to writing the bit stream into the rate buffer. This macroblock boundary information is then written into the rate buffer along with the bit stream, to thereby facilitate routing of the macroblocks into two system partitions which receive the bit stream data from a single output of the rate buffer. This technique is made possible by virtue of the fact that the MPEG-2 coding protocol imposes a maximum limit on the number of bits which can be contained in a macroblock. More particularly, the maximum size of a macroblock for an MPEG-2 Main Profile, High Level compliant HDTV Decoder is 4608 bits. The worst case macroblock in an MPEG-2 digital video bit stream is comprised of six (6) 8×8 blocks of Discrete Cosine Transform (DCT) coefficients, i.e., a total of 6×64=384 DCT coefficients. Thus, the worst case macroblock has an allocation of no more than 12 bits per DCT coefficient on average. A small macroblock partition FIFO memory of 4608 bits is therefore sufficient to hold the worst case macroblock.

If the rate buffer bus width (normally 32 bits) is at least two times greater than the guaranteed highest average word length in the macroblock (i.e., 12 bits), it is quite apparent that in an HDTV video decoder with two partitions, both FIFO memories (one for each partition) will be provided with a sufficient amount of data at the same rate that the MPEG-2 digital video bit stream is decoded, thus enabling the decoder to extract and decode an entire picture from the rate buffer in real-time, i.e., for the actual duration of the display time of the picture. For example, if all 32 bits output by the rate buffer are used for the bit stream data, and both the write and read cycles of the FIFO memories are synchronized by the same clock, the effective rate of writing the data into the FIFO memories is 32/12=2.67 times faster than the rate of decoding by a single VLD partition. This fact supports the feasibility of the present invention.

In view of the foregoing, the present invention, in one of its aspects, encompasses a macroblock-level partitioned digital HDTV video decoder for decoding an MPEG bit stream which includes a plurality of macroblocks of digital video data, which includes a bit stream parser for identifying boundaries between the macroblocks in the bit stream and producing macroblock boundary information indicative of the identified boundaries, a bit stream formatter for combining the macroblock boundary information with the MPEG bit stream to produce a combined bit stream comprised of successive multi-bit portions, a rate buffer for storing the successive multi-bit portions of the combined bit stream and for sequentially outputting the successive multi-bit portions of the combined bit stream, first and second FIFO memories, a FIFO controller for alternately write enabling the first and second FIFO memories in response to the macroblock boundary information, whereby the first and second FIFO memories alternately store different successive macroblocks in the combined bit stream sequentially outputted from the rate buffer, and first and second variable length decoders for reading and decoding the successive multi-bit portions of the combined bit stream respectively stored by the first and second FIFO memories. The bit stream formatter preferably byte-wise aligns the beginning of each macroblock in the MPEG bit stream and a corresponding start code in the MPEG bit stream to one of a plurality of possible start positions. The macroblock boundary information preferably includes a plurality of ID bits (e.g., 3 bits for four possible start positions and a "no start" position). The system clock is preferably ½ of the pixel rate of a picture represented by the MPEG bit stream. The FIFO controller preferably further functions to detect skipped macroblocks and to supply a control signal indicative of detected skipped macroblocks to the respective variable length decoder, which is responsive to the control signal supplied thereto to produce a predetermined output for the duration of a detected skipped macroblock. The FIFO controller also preferably functions to detect start code and macroblock start positions, and to store the same multi-bit portion of the combined bit stream output by the rate buffer in both of the first and second FIFO memories in the event that the FIFO controller detects the beginning of a macroblock or start code in the middle of a data field.

The present invention also encompasses a related method.

BRIEF DESCRIPTION OF THE DRAWINGS

These and various other features and advantages of the present invention will be readily understood with reference to the following detailed description read in conjunction with the attached drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the present invention would be of significant utility.

Figure 1:
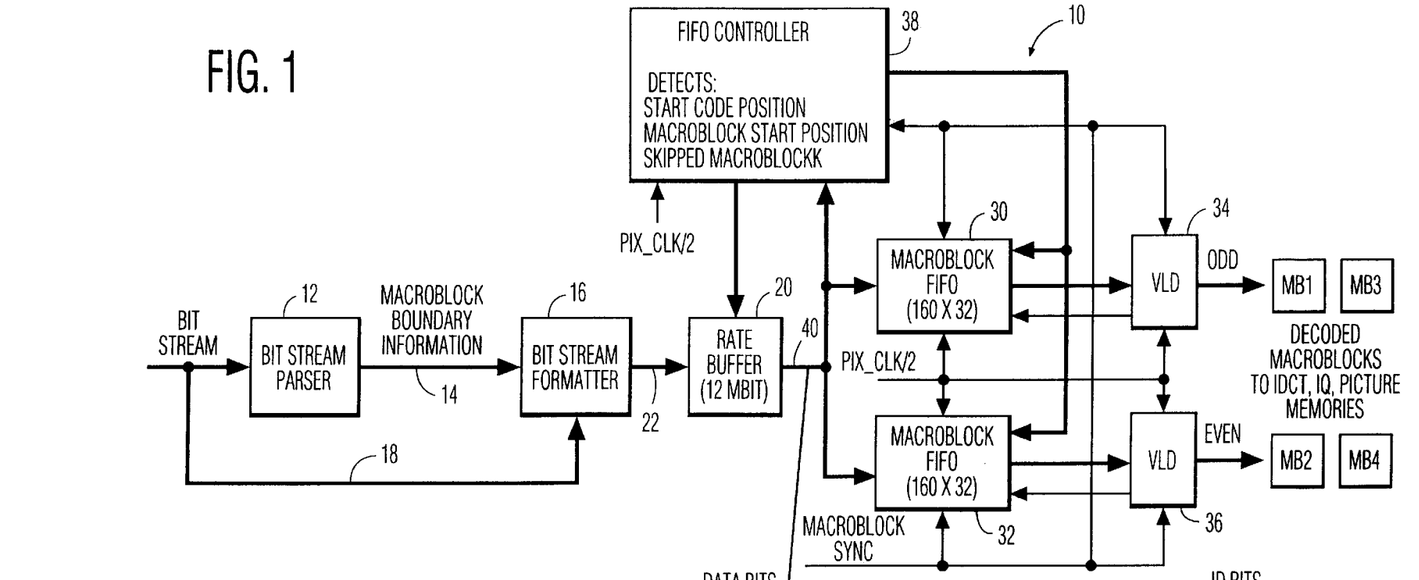
FIG. 1 is a functional block diagram of a macroblock-level partitioned HDTV video decoder constructed in accordance with a currently preferred embodiment of the present invention.

With reference now to FIG. 1, there can be seen a functional block diagram of a macroblock-level partitioned HDTV video decoder 10 constructed in accordance with a currently preferred embodiment of the present invention. The video decoder 10 includes a bit stream parser 12 which analyzes the incoming MPEG-2 digital video bit stream to determine the beginning of each macroblock within the incoming bit stream, and to produce an output ("Macroblock Boundary Information") which identifies the beginning of each macroblock within the incoming bit stream. The bit stream parser 12 can be operated at a relatively slow bit rate. Thus, the bit stream parser 12 can be implemented as a tree-searching state machine or as a group of state machines. The bit stream parser 12 can be implemented to serve the sole function described above. If the bit stream parser 12 is implemented as such a dedicated device, then it can be appropriately scaled down. However, it should be clearly understood that the specific implementation of the bit stream parser 12 is not limiting to the present invention.

The Macroblock Boundary Information output by the bit stream parser 12 is applied over a line 14 to a first input of a bit stream formatter 16, and the incoming bit stream is applied over a line 18 to a second input of the bit stream formatter 16. Assuming that the bus width of the rate buffer 20 is 32 bits, the bit stream formatter 16 functions to byte align the beginning of each macroblock in the incoming bit stream and a corresponding start code in the incoming bit stream to one of four possible start positions, designated as start positions 0, 1, 2, and 3, respectively. In order to identify the one out of four possible start positions for each successive 29 data bit portion of the incoming bit stream output by the bit stream formatter 16, a 3-bit ID code is utilized in the currently preferred embodiment of the present invention.

Thus, with this embodiment, 29 bits of each successive 32 bit word output by the bit stream formatter and applied over the 32-bit wide input bus 22 to the rate buffer 20 comprise data bits, and 3 bits of each successive 32 bit word output by the bit stream formatter and applied over the input bus 22 to the rate buffer 20 comprise the ID bits identifying the corresponding start position for that word.

Figure 2:
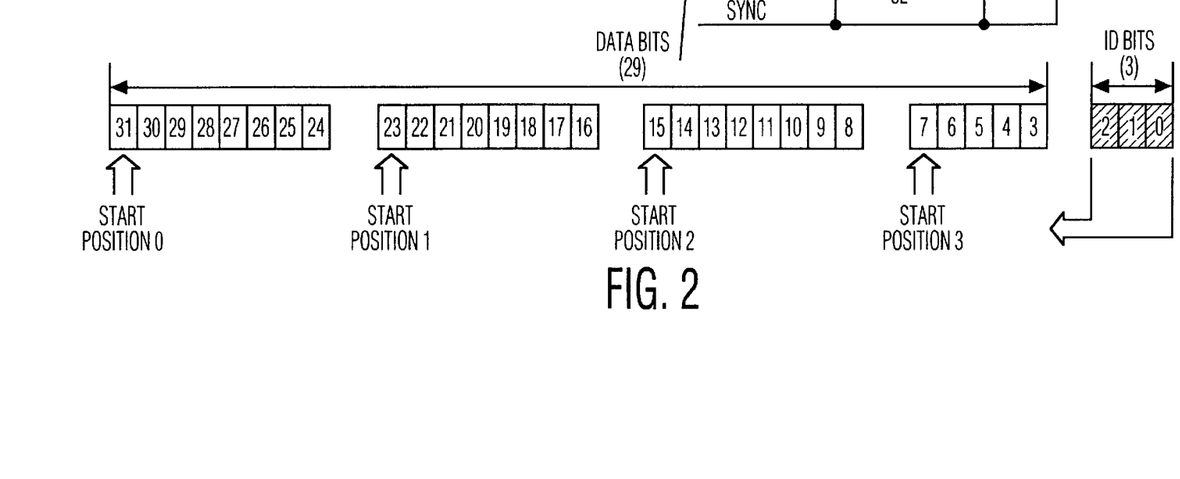
FIG. 2 is a representational diagram of the data structure of 32-bit portions of the input bit stream which are input to the rate buffer of the HDTV video decoder depicted in FIG. 1; and, FIG. 3 is a functional block diagram of either one of the two VLDs of the HDTV video decoder depicted in FIG. 1.

The resultant data structure is depicted in FIG. 2. In an exemplary embodiment, the information carried by the ID bits 0 through 2 is as follows:

000—indicates no macroblock or start code start in the current 29-bit portion of the bit stream;

001—indicates macroblock or start code at start position 0;

010—indicates macroblock or start code at start position 1;

011—indicates macroblock or start code at start position 2;

100—indicates macroblock or start code at start position 3;

101—reserved;

110—reserved; and,

111—reserved.

Start codes in the incoming bit stream are easily distinguishable from starts of macroblocks because the "Macroblock Address Increment" code word in the MPEG-2 Huffman look-up table has at least one non-zero bit among the leading seven bits of its code. This can be decoded by simple logic in the decoder, and therefore, both macroblocks and start codes are uniquely identified by the four 3-bit ID codes 001 to 100, and the absence of any start code is identified by the ID code 000. The presence of a start code is identified by logically OR'ing the 3 ID bits, and its byte location is uniquely identified by the codes 001 to 100. Codes 101 to 111 are not used and are reserved for future improvements.

In accordance with the MPEG-2 coding protocol, start codes are comprised of thirty-two start code bits including twenty-three leading zeros followed by a one. Since the start codes are now identified by the three ID bits, they no longer have to be unique. Accordingly, the sixteen leading zeros can be dispensed with, i.e., removed by the bit stream formatter 16, thus reducing the memory requirements of the rate buffer 20, and simplifying the VLD operation to be described hereinafter. As previously mentioned, seven leading zeros are used to distinguish between a start code and a macroblock.

The byte-wise alignment of the macroblocks and start codes is provided by the bit stream formatter 16 in order to minimize the amount of extra rate buffer memory required due to the alignment operation. With the byte-wise alignment scheme, a maximum of seven bits of additional rate buffer memory is required for storage of each macroblock, due to the fact that the last bit of a macroblock can fall into a random bit position within a byte. For an MPEG-2 Main Profile, High Level compliant HDTV Decoder, such a byte-wise alignment scheme would require an amount of additional rate buffer memory calculated as follows. More particularly, the maximum number of extra bits required per macroblock (7) is multiplied by the maximum number of macroblocks in the picture of the highest resolution ((1920× 1080)/256=8100), which product (56,700) is multiplied by the maximum number of pictures that can be potentially stored in the rate buffer at the same time (15), yielding a total of 56,700×15=850,500 additional bits of rate buffer memory required to accomodate the byte-wise alignment scheme. Statistically, however, the amount of extra memory required to accomodate the byte-wise alignment scheme is about half of that required for the absolute worst case described above. A 32-bit alignment scheme would somewhat simplify the decoder. However, in this case, an additional 31 bits of additional rate buffer memory is required per macroblock, thereby requiring an additional 3,766,500 bits of rate buffer memory.

An MPEG-2 Main Profile, High Level compliant HDTV Decoder is required to have a rate buffer size of 9,781,248 bits. Since efficient memories such as asynchronous DRAMs are only available in 2" increments, (e.g., 4 Mb, 8 Mb, 16 Mb, 64 Mb, etc.), the closest available efficient memory is a 12 Mb memory. This memory can be implemented as three 4 Mb DRAMs in a 393,216×32 configuration, or as a 16 Mb DRAM. Due to the fact that only 29 bits of every 32 bits of the incoming bit stream which are stored by the rate buffer 20 are data bits (the remaining 3 bits being ID bits), a total of 393,216×3=1,179, 648 extra bits of rate buffer memory are required to accomodate the ID bits. Thus, the total number of extra bits of rate buffer memory required to accomodate the byte-wise alignment scheme and the ID bits is 1,179,648+850,500=2, 030,148. Thus, a 12 Mb rate buffer would have an available memory space of (393,216×32=12,582,912)−2,030,148=10, 552,764 bits for storing the incoming bit stream data. Thus, a 12 Mb rate buffer still has 10,552,764−9,781,248=771,516 bits (approx. 0.74 Mb) more memory than is required by the MPEG-2 Main Profile, High Level protocol. It will be recognized that an MPEG-2 Main Profile, High Level-complaint rate buffer will, as a practical matter, also have to be implemented as either a 12 Mb or 16 Mb DRAM, due to the fact that more than 8 Mb of memory is required, i.e., 9,781,248 bits of memory is required.

Each 32-bit portion of the bit stream output by the rate buffer 20 includes 29 data bits and 3 ID bits. The macroblock-level partitioned HDTV video decoder 10 of the present invention is partitioned into two system partitions, including two macroblock FIFO memories 30, 32, and two respective VLDs 34, 36. A FIFO controller 38 is provided in order to detect start code and macroblock start positions, and to detect skipped macroblocks, in a manner to be described hereinafter. The output of the rate buffer 20 (i.e., successive 32-bit words) are applied over a 32-bit wide rate buffer output bus 40 to respective inputs of the FIFO memories 30, 32, and the FIFO controller 38. The required size of these FIFO memories 30, 32 is a critical factor with respect to realizing a cost-effective partitioned HDTV video decoder. With the present invention, since the decoder is partitioned on the macroblock level, each word sequentially output by the rate buffer 20 includes 29 data bits and 3 ID bits (i.e., a total of 32 bits), and the maximum macroblock size for an MPEG-2 bit stream is 4608 bits, then each FIFO memory 30, 32 must have 4608/29=158.9 addressable storage locations for storage of the data words constituting a maximum size macroblock. To accomodate the three ID bits, a memory size of 160×32 is adequate.

Moreover, since the decoder has two partitions, the required clock rate for real-time decoding of each successive macroblock in the incoming MPEG-2 bit stream is ½ of the pixel clock rate, i.e., PIX_CLK/2. The entire decoder is operated by the same slow clock, i.e., PIX CLK/2 is applied to the FIFO controller 38, which controls both the rate buffer 20 and the macroblock FIFO memories 30, 32, and to the VLDs 34, 36. Thus, the desired goals of reducing the memory requirements and required memory access speed of the decoder, and of synchronizing the entire decoder to the same slow clock (i.e., PIX_CLK/2) has been achieved.

The write cycle of the macroblock FIFO memories 30, 32 is controlled by way of the FIFO controller 38 monitoring the ID bits of each successive 32-bit word sequentially read from the rate buffer 20, in order to identify (detect) the beginning of a macroblock or a start code, if any, in the 29-bit data portion of each successive 32-bit word sequentially read from the rate buffer 20. As previously discussed, the macroblocks are easily distinguishable from the start codes on the basis of the content of the first seven bits. The FIFO controller 38 further functions to alternately activate the write enable control signals of the FIFO memories 30, 32, in response to the detection of successive macroblocks, on the basis of the ID bits, whereby successive macroblocks are alternately loaded into the FIFO memories 30, 32. If the ID bits identify a beginning of a macroblock or start code in the middle of the data field (i.e., start position is not 0 in FIG. 2), then the FIFO controller 38 activates the write enable control signal applied to both FIFO memories 30 and 32, to thereby write the corresponding 32-bit word into both FIFO memories 30 and 32.

The skipped macroblocks are easily detected by the FIFO controller 38 by decoding the "Macroblock Address Increment" code value which is the first code word in each macroblock in accordance with the MPEG-2 protocol. Although this code is a Huffman code, its value can be easily determined by the FIFO controller 38 because its position is aligned to one of the bytes and is available from the ID bits. If the value of the "Macroblock Address Increment" code is found to be other than one, the presence of a skipped macroblock is detected and a unique code value is written to the corresponding FIFO memory in order to subsequently inform the associated VLD that this macroblock does not have to be decoded (i.e., in order to inform the associated VLD to skip this macroblock). The FIFO controller 38 repeats this procedure as many times as is necessary by counting the macroblock sync signal which is available to it and then comparing this count with the value of the decoded "Macroblock Address Increment" code. As a result, both VLDs 34 and 36 receive and decode strictly odd or even macroblocks identified as such by the picture progression.

Figure 3:
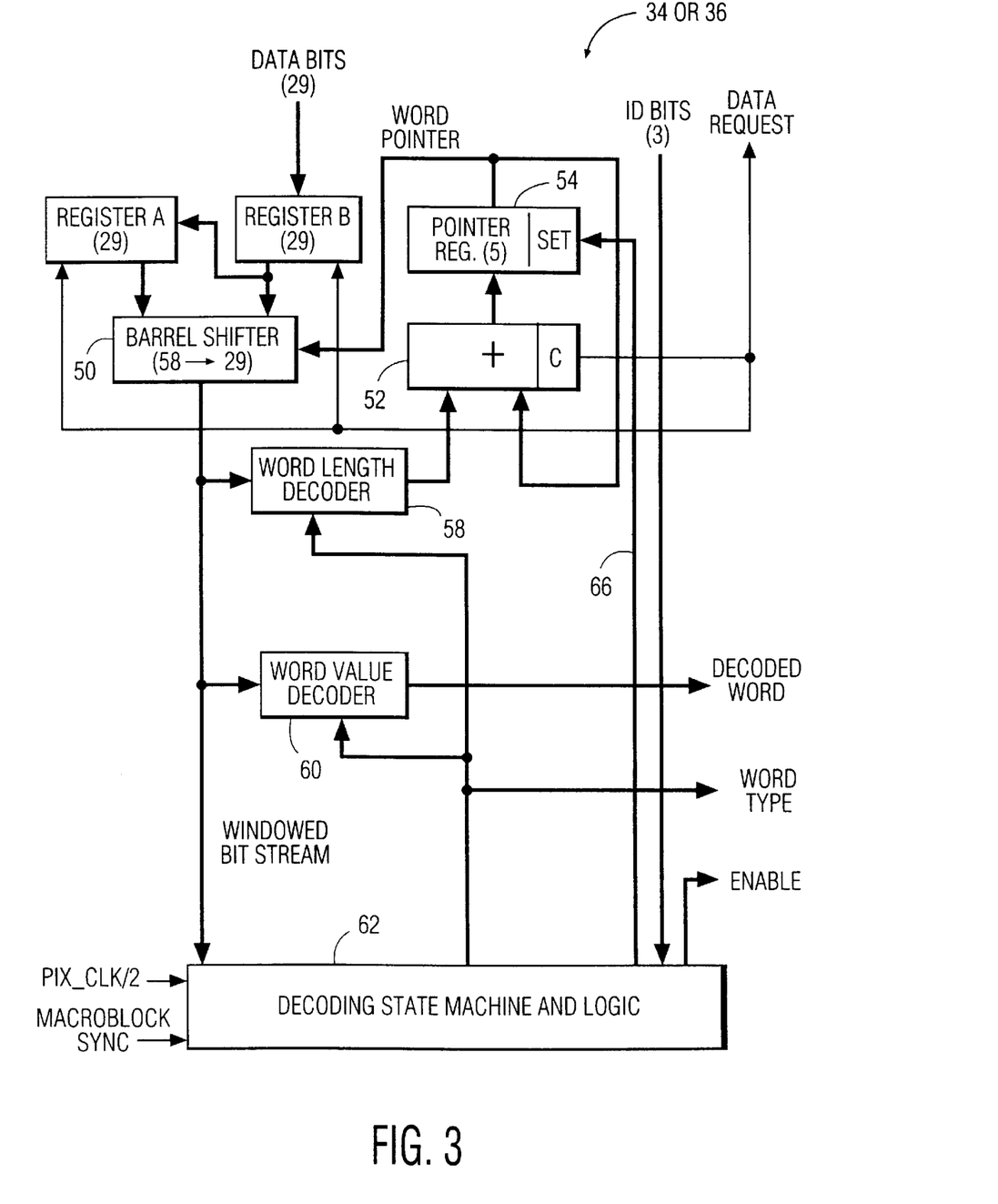

With reference now to FIG. 3, there can be seen a block diagram of one of the VLDs (34 or 36), it being understood that the construction and operation of both VLDs 34 and 36 are identical. The basic design and operation of the VLDs 34 and 36 is similar to that described in the previously referenced co-pending U.S. patent applications of the present inventor, and will only be briefly summarized herein. More particularly, the 29-bit wide data portions of the bit stream output by the corresponding macroblock FIFO memory (30 or 32) are loaded into serially connected registers A and B. A barrel shifter 50 having a 58-bit wide input provides an output decoding window having a bit width equal to or higher than the maximum length code word (which are 24-bit DCT coefficients in accordance with the MPEG-2 protocol, assuming that the start codes have been reduced from 32 bits to 16 bits by eliminating the leading 16 zeros in accordance with that previously described aspect of the present invention). In the preferred embodiment, the bit width of the output decoding window is 29 bits, in order to enable real-time decoding of the macroblocks at ½ the pixel clock rate.

In response to a control signal "Word Pointer" generated by an adder-accumulator circuit comprised of an adder 52 and a pointer register 54, the barrel shifter 50 directly shifts its output decoding window across a sequence of 58 available input bits as each code word in the received bit stream is detected. After each code word is decoded, the output decoding window is shifted by the adder-accumulator circuit by the number of bits corresponding to the length of the last decoded code word. The overflow of the adder 52 triggers the production of a "Data Request" signal, which triggers the reading of the next 32-bit word from the corresponding FIFO memory, and simultaneously, the discarding of the contents of register A, a shifting of the contents of register B into register A, and the loading of the next 29-bit data word (which is included in the next 32-bit word read from the corresponding FIFO memory) into the register B. The bit length of each code word in the received bit stream is determined by the word length decoder 58, and the value of each code word in the received bit stream is decoded by the word value decoder 60. The decoding state machine 62 controls the decoding process in accordance with the MPEG-2 protocol.

In accordance with the present invention, the beginning of a macroblock or a start code is identified by the three ID bits contained in each 32-bit word read from the corresponding FIFO memory. The three ID bits contained in each 32-bit word read from the corresponding FIFO memory are supplied to the decoding state machine 62, which decodes the ID bits and produces a pointer register set signal which is applied via a line 66 to a set input of the pointer register 54, to thereby set the pointer register 54 to the value corresponding to one of the start positions 0 through 3 according to FIG. 2. The resultant "Word Pointer" value generated by the pointer register 54 and applied to the shift input of the barrel shifter 50 causes the barrel shifter 50 to shift its output decoding window across the sequence of 58 available input bits to the first code word in the macroblock. The decoding process begins at this point.

Skipped macroblocks appear in the bit stream received by the VLD as a unique code value inserted into the bit stream by the FIFO controller 38. This value is identified by the decoding state machine 62, which either disables the VLD output for the duration of the current macroblock or produces a sequence of zero values at its output for the duration of the current macroblock. This mechanism guarantees the natural picture progression and renders possible further real-time picture processing.

An additional advantage achieved with this VLD architecture is a reduced bus width, which results in a reduction in VLD hardware cost and an improvement in its speed of operation. More particularly, the bus width of the barrel shifter has to accomodate the longest words in the bit stream, which is normally the 32-bit start codes for an MPEG-2 bit stream. However, truncating the start code in accordance with that previously described aspect of the present invention from 32 bits to 16 bits enables the use of a barrel shifter having a 29-bit output decoding window (with the VLD architecture of the preferred embodiment). With the barrel shifter matrix implementation disclosed in the present inventor's co-pending U.S. patent application Ser. No. 08/583,149, filed Dec. 28, 1995 and herein incorporated by reference, the number of gates required for the barrel shifter $62$ of the VLDs $34$ and $36$ of the present invention is equal to $29^2=841$. The prior art architecture would require $32^2=1024$ gates. Thus, an 18% savings in gate count is achieved over the prior art implementation, along with a commensurate reduction in propagation delays.

The run-length decoding (RLD) function for the DCT coefficients can also be incorporated into the VLDs $34$ and $36$ by directing the decoding state machine $62$ to operate in a start-stop mode. This is possible due to regular macroblock sync timing. The odd and even macroblocks from the outputs of the VLDs $34$ and $36$ are delivered to downstream sub-systems of the HDTV video decoder with fixed timing in the order of natural picture progression as compared to prior art partitioned HDTV video decoders that operate on partitions of a much larger size, i.e., a minimum size of a full raster of slices. Partitioning of other timing-critical functions of the HDTV video decoder is also possible due to the availability of two concurrent macroblock streams ("Odd" and "Even") at the outputs of the VLDs $34$ and $36$.

The HDTV video decoder $10$ of the present invention achieves several advantages over the presently available decoders, including, but not limited to the below-enumerated advantages:

(1) The decoder is partitioned on the macroblock level with minimal memory utilization in silicon;

(2) The entire system can be synchronized to a clock whose rate is equal to one-half the pixel rate;

(3) Complex high-speed "concurrent" multi-port access to the rate buffer and the associated memory overhead are eliminated;

(4) A 50% reduction in the required rate buffer memory speed;

(5) Decoded picture partitions are in the order of picture progression;

(6) Efficient utilization of already available and otherwise unused ("free") rate buffer memory;

(7) Improvement in VLD speed performance; and, (8) Savings in VLD gate count.

Although currently preferred embodiments of the present invention have been described in detail hereinabove, it should be clearly understood that many variations and/or modifications of the basic inventive concepts taught herein which may appear to those skilled in the pertinent art will still fall within the spirit and scope of the present invention, as defined in the appended claims. For example, the number of macroblocks stored in the partition (FIFO) memories, the number of partition paths, the clock, and the data structure stored in the rate buffer can all be specified differently without departing from the spirit and scope of the present invention.

What is claimed is:

1. A method for decoding a bit stream which includes a plurality of blocks of data, which blocks are in the form of macroblocks, comprising the steps of:

identifying boundaries between the blocks of data in the bit stream and producing block boundary information indicative of the identified boundaries;

combining the block boundary information with the bit stream to produce a combined bit stream, said combining being carried out by byte-wise aligning the beginning of each block in the bit stream and a corresponding start code in said stream with one of a plurality of possible start positions;

storing the combined bit stream in a rate buffer;

reading the combined bit stream from the rate buffer; and decoding the combined bit stream read out from the rate buffer.

2. The method as set forth in claim 1, wherein the identifying step is carried out using a bit stream parser.

3. The method as set forth in claim 1, wherein the combining step is carried out using a bit stream formatter.

4. The method as set forth in claim 1, wherein:

the bit stream comprises a digital video bit stream.

5. The method as set forth in claim 4, wherein the digital video bit stream is coded in accordance with a predetermined digital video compression code.

6. The method as set forth in claim 5, wherein the plurality of possible start positions comprises four such positions.

7. The method as set forth in claim 5, wherein the block boundary information comprises a plurality of ID bits which identify the one of said plurality of possible start positions.

8. The method as set forth in claim 7, wherein the combining step is carried out by a bit stream formatter in response to the block boundary information.

9. The method as set forth in claim 8, wherein the bit stream formatter produces the combined bit stream as successive words each comprised of a plural-bit data portion combined with plural ID bits, and is output from the bit stream formatter over a parallel data bus.

10. The method as set forth in claim 9, wherein the data portion of each successive word output by the bit stream formatter is comprised of 29 bits and the number of ID bits is 3.

11. The method as set forth in claim 9, wherein the decoding step is carried out by using at least two variable length decoders.

12. The method as set forth in claim 11, further including the steps of:

supplying the ID bits of the successive words of the combined bit stream read out of the rate buffer to respective ones of the variable length decoders; and, wherein the variable length decoders are each responsive to the block boundary information supplied thereto to shift an output decoding window thereof to the start of a next macroblock to be decoded thereby.

13. The method as set forth in claim 12, further including the steps of:

detecting skipped macroblocks;

producing control data indicative of detected skipped macroblocks;

supplying the control data to respective ones of the variable length decoders; and, wherein the variable length decoders are each responsive to the control data supplied thereto to produce a predetermined output for the duration of a detected skipped macroblock indicated by the control data.

14. The method as set forth in claim 1, wherein the decoding step is carried out by using at least two variable length decoders.

15. The method as set forth in claim 14, further including the steps of:

supplying the block boundary information to each of the variable length decoders; and, wherein the variable length decoders are each responsive to the block boundary information supplied thereto to shift an output decoding window thereof to the start of a next block of data to be decoded.

16. The method as set forth in claim 14, wherein successive blocks in the combined bit stream are alternately stored in a different one of at least two FIFO memories provided between the rate buffer and respective ones of the variable length decoders.

17. The method as set forth in claim 16, wherein a common clock is used to operate the rate buffer, the FIFO memories, and the variable length decoders.

18. The method as set forth in claim 17, wherein the common clock is ½ of a pixel rate of a picture represented by the bit stream.

19. The method as set forth in claim 18, wherein the bit stream is a digital video bit stream which is coded in accordance with a predetermined digital video compression code.

20. An apparatus for decoding a bit stream which includes a plurality of blocks of data, which blocks are in the form of macroblocks; said apparatus comprising:

means for identifying boundaries between the blocks of data in the bit stream and producing block boundary information indicative of the identified boundaries;

means for combining the block boundary information with the bit stream to produce a combined bit stream consisting of successive multi-bit portions, said combining being carried out by byte-wise aligning the beginning of each block in the bit stream and a corresponding start code in said stream with one of a plurality of possible start positions;

a rate buffer for storing and sequentially outputting the successive multi-bit portions of the combined bit stream; and means for decoding the successive multi-bit portions of the combined bit stream sequentially outputted from the rate buffer.

21. The apparatus as set forth in claim 20, wherein the identifying means comprises a bit stream parser.

22. The apparatus as set forth in claim 20, wherein the combining means comprises a bit stream formatter.

23. The apparatus as set forth in claim 20, wherein:

the bit stream comprises a digital video bit stream.

24. The apparatus as set forth in claim 23, wherein the digital video bit stream is coded in accordance with a predetermined digital video compression code.

25. The apparatus as set forth in claim 24, wherein the block boundary information comprises a plurality of ID bits which identify the one of said plurality of possible start positions.

26. The apparatus as set forth in claim 25, wherein the combining means comprises a bit stream formatter which is responsive to the block boundary information for combining the block boundary information with the bit stream to produce the combined bit stream.

27. The apparatus as set forth in claim 26, wherein the successive multi-bit portions of the combined bit stream are each comprised of a plural-bit data portion combined with plural ID bits and output from the bit stream formatter over a parallel data bus.

28. The apparatus as set forth in claim 27, wherein the data portion of each successive multi-bit portion of the combined bit stream output by the bit stream formatter is comprised of 29 bits and the number of ID bits is 3.

29. The apparatus as set forth in claim 27, wherein the decoding means comprises at least two variable length decoders.

30. The apparatus as set forth in claim 29, further including:

means for supplying the ID bits of the successive multi-bit portions of the combined bit stream sequentially outputted from the rate buffer to respective ones of the variable length decoders; and, wherein the variable length decoders are each responsive to the block boundary information supplied thereto to shift an output decoding window thereof to the start of a next macroblock to be decoded thereby.

31. The apparatus as set forth in claim 30, further including:

means for detecting skipped macroblocks and for producing control data indicative of detected skipped macroblocks, and for supplying the control data to respective ones of the variable length decoders; and, wherein the variable length decoders are each responsive to the control data supplied thereto to produce a predetermined output for the duration of a detected skipped macroblock indicated by the control data.

32. The apparatus as set forth in claim 20, wherein the decoding means comprises at least two variable length decoders.

33. The apparatus as set forth in claim 32, further including:

means for supplying the block boundary information to each of the variable length decoders; and, wherein the variable length decoders are each responsive to the block boundary information supplied thereto to shift an output decoding window thereof to the start of a next block of data to be decoded.

34. The apparatus as set forth in claim 32, further comprising:

at least two FIFO memories provided between the rate buffer and respective ones of the variable length decoders; and, means for alternately storing successive blocks in the combined bit stream in a different one of the at least two FIFO memories.

35. The apparatus as set forth in claim 34, further comprising a common clock to operate the rate buffer, the FIFO memories, and the variable length decoders.

36. The apparatus as set forth in claim 35, wherein the common clock is ½ of a pixel rate of a picture represented by the bit stream.

37. The apparatus as set forth in claim 36, wherein the bit stream is a digital video bit stream which is coded in accordance with a predetermined digital video compression code.

38. An apparatus for decoding a bit stream which includes a series of macroblocks of digital video data which are coded in accordance with a predetermined digital video compression code; said apparatus comprising:

- a bit stream parser for identifying boundaries between the macroblocks in the bit stream and producing macroblock boundary information indicative of the identified boundaries;
- a bit stream formatter for combining the macroblock boundary information with the bit stream to produce a combined bit stream consisting of successive multi-bit portions, said combining being carried out by byte-wise aligning of the beginning of each block in the bit stream and a corresponding start code in said bit stream with one of a plurality of possible start positions;
- a rate buffer for storing and sequentially outputting the successive multi-bit portions of the combined bit stream;
- first and second FIFO memories;
- a FIFO controller for alternately write enabling the first and second FIFO memories in response to detection of the macroblock boundary information, whereby the first and second FIFO memories alternately store successive macroblocks of the combined bit stream sequentially outputted from the rate buffer; and
- first and second variable length decoders for decoding the successive macroblocks in the combined bit stream respectively stored in the first and second FIFO memories.

* * * * *